Aug. 2, 1966  B. B. STOCKARD, JR  3,263,541
METAL WORKING MACHINES
Original Filed Aug. 18, 1964  5 Sheets-Sheet 1

INVENTOR
BEN B. STOCKARD, JR.
BY Munson H. Lane
ATTORNEY

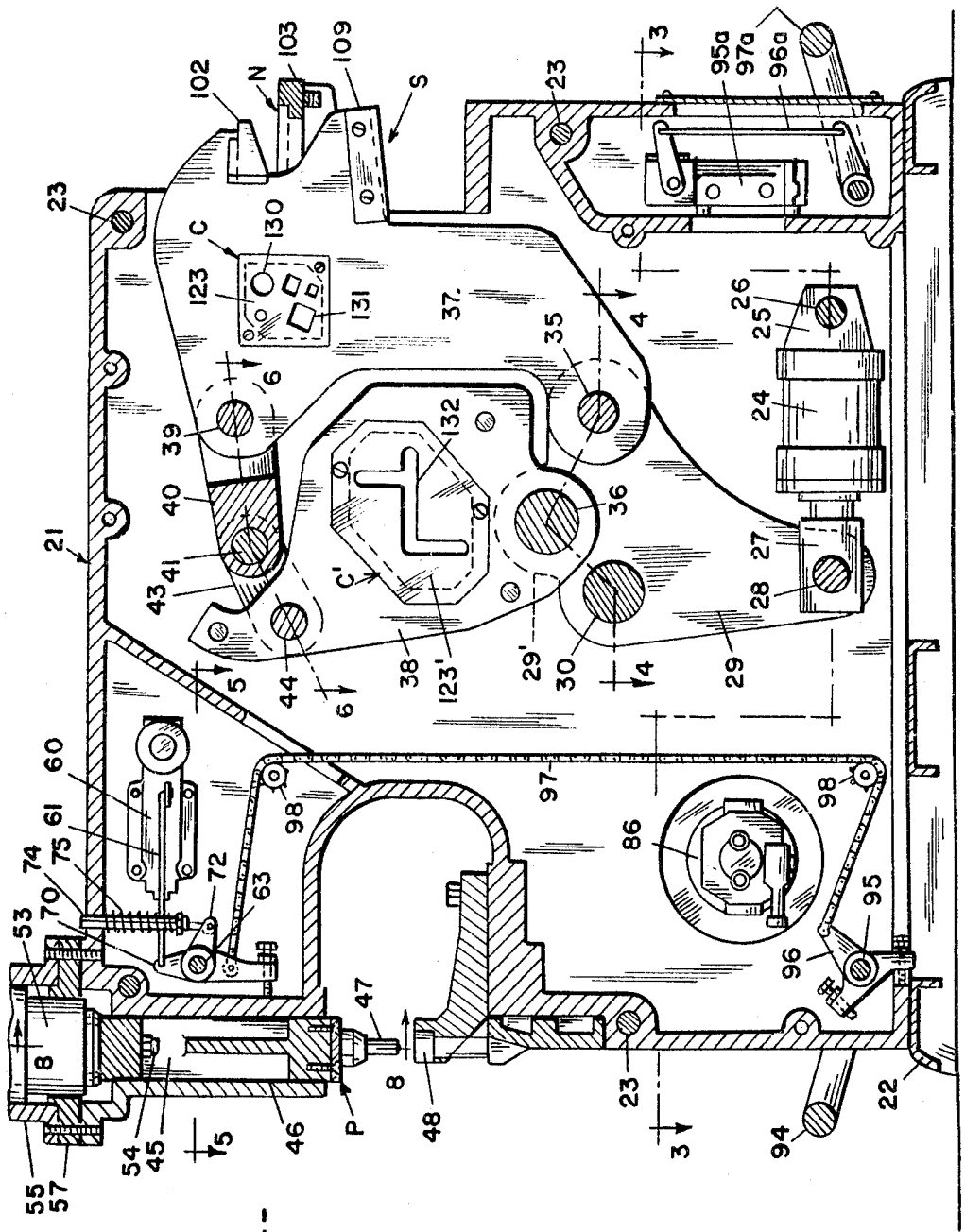

Aug. 2, 1966    B. B. STOCKARD, JR    3,263,541
METAL WORKING MACHINES
Original Filed Aug. 18, 1964    5 Sheets-Sheet 3
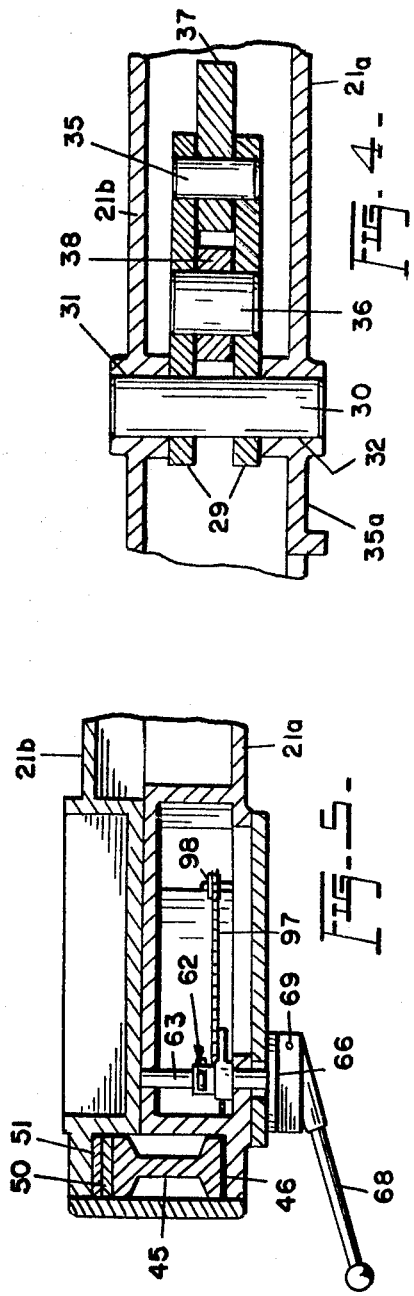
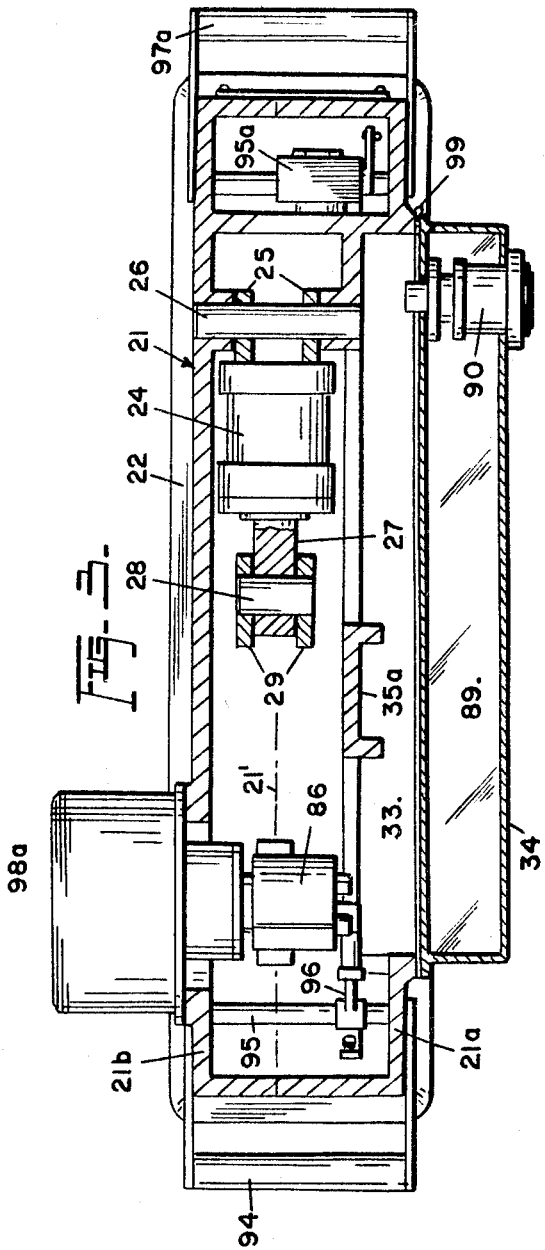
INVENTOR
BEN B. STOCKARD, JR.
BY *Munson H. Lane*
ATTORNEY

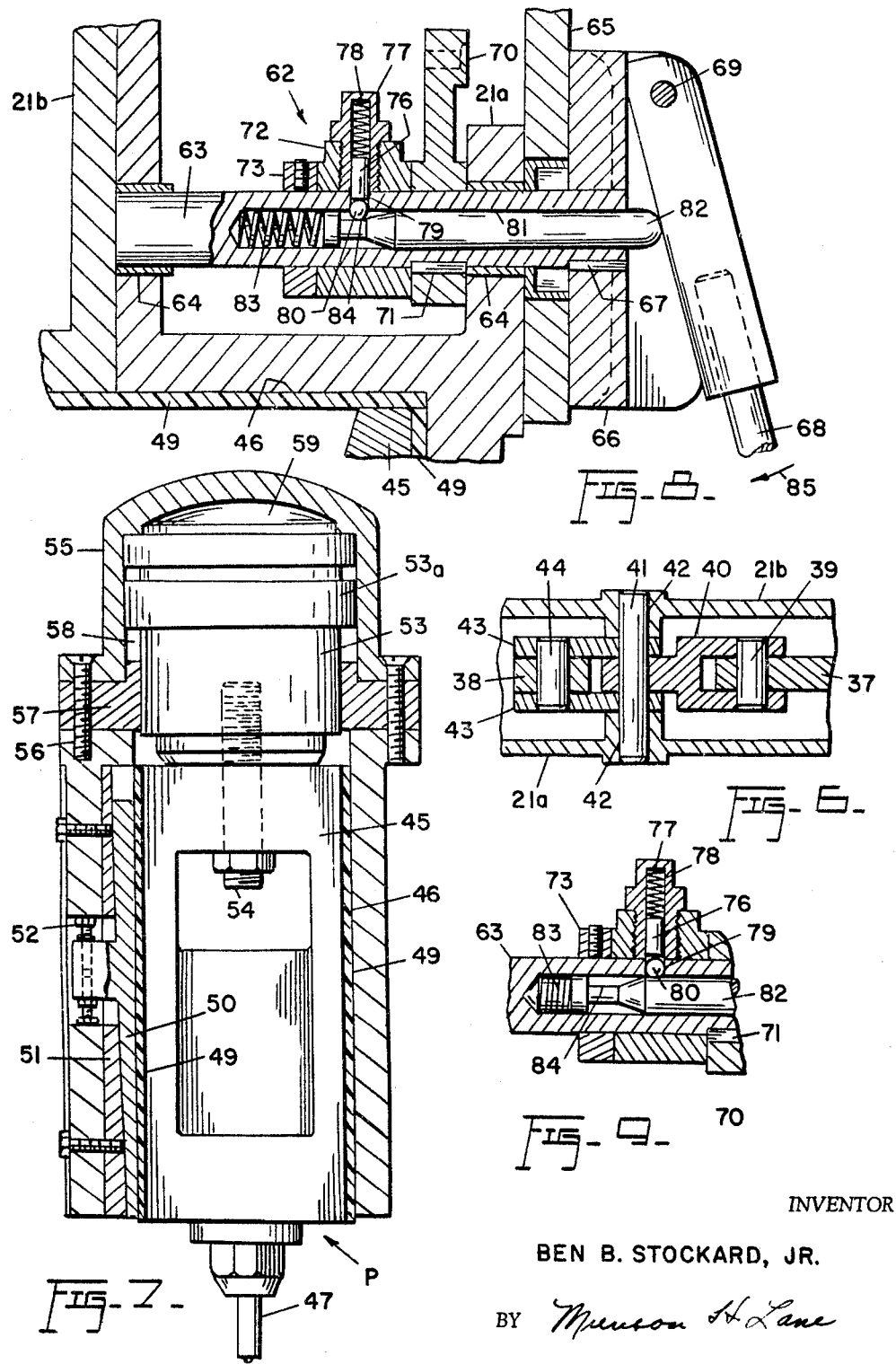

Aug. 2, 1966   B. B. STOCKARD, JR   3,263,541
METAL WORKING MACHINES
Original Filed Aug. 18, 1964   5 Sheets-Sheet 5
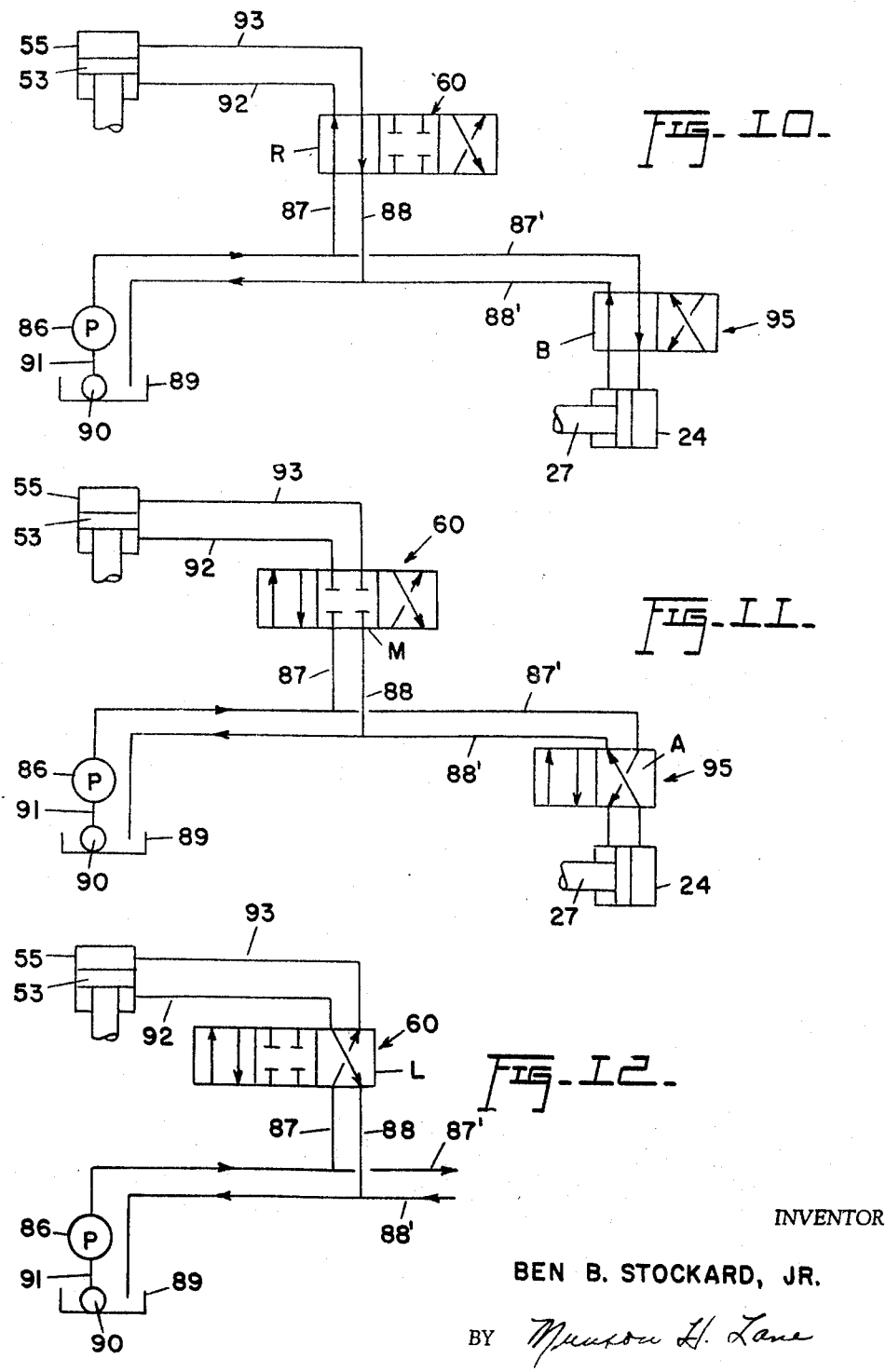
INVENTOR
BEN B. STOCKARD, JR.
BY Munson H. Lane
ATTORNEY United States Patent Office 3,263,541
Patented August 2, 1966

3,263,541
METAL WORKING MACHINES
Ben B. Stockard, Jr., Greensboro, N.C., assignor to Wysong & Miles Company, Greensboro, N.C.
Original application Aug. 18, 1964, Ser. No. 390,381. Divided and this application Oct. 5, 1965, Ser. No. 503,407
2 Claims. (Cl. 83—197)

The present application is a division of my application Serial No. 390,381, filed August 18, 1964.

This invention relates to new and useful improvements in metal working machines, and the principal object of the invention is to provide a highly compact, simple and durable machine which may be effectively employed for performing a variety of metal working operations such as, for example, cutting round or flat bar stock, cutting, notching or bevelling angle bars, shearing, punching, and the like.

As such, the machine of the invention is related to that disclosed in my co-pending application Serial Number 226,062, bled September 25, 1962, now Patent No. 3,169,-433. While in that application the various metal working components of the machine are mechanically actuated, an important feature of the present invention resides in the provision of hydraulic means for actuating such components.

Another feature of the present invention involves the provision of simple, manually operated means for controlling the operation of the hydraulic actuating means, the manual control means being readily accessible, selectively usable and dependable.

With the foregoing more important object and features in view and such other objects and features as may become apparent as this specification proceeds, the invention will be understood from the following description taken in conjunction with the accompanying drawings, in which like characters of reference are used to designate like parts and in which:

FIGURE 2 is a fragmentary vertical sectional view thereof;

FIGURE 3 is a horizontal sectional view, taken substantially in the plane of the line 3—3 in FIGURE 2;

FIGURE 4 is a fragnmentary horizontal sectional view, taken substantially in the plane of the line 4—4 in FIGURE 2;

FIGURE 5 is a fragmentary horizontal sectional view, taken substantially in the plane of the line 5—5 of FIGURE 2;

FIGURE 6 is a fragmentary horizontal sectional view, taken substantially in the plane of the line 6—6 in FIGURE 2;

FIGURE 7 is a vertical sectional detail on an enlarged scale, taken substantially in the plane of the line 7—7 in FIGURE 2;

FIGURE 8 is an enlarged, fragmentary sectional detail of the punch cylinder control;

FIGURE 9 is a fragmentary sectional detail showing the control of FIGURE 8 in a different position; and FIGURES 10, 11 and 12 are diagrammatic illustrations showing the hydraulic components of the machine in different positions of control.

Figure 1:
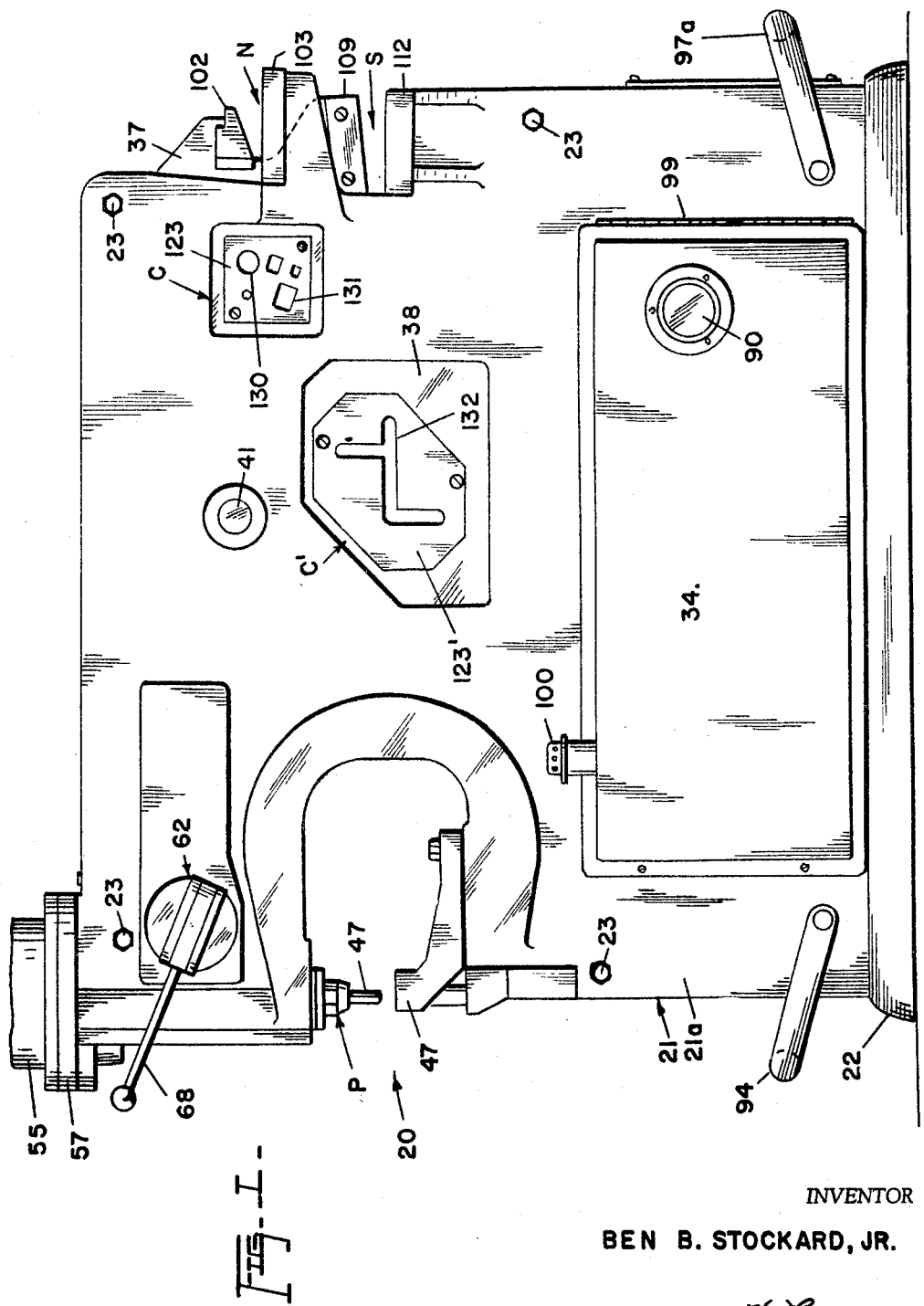
FIGURE 1 is a side elevational view of the metal working machine in accordance with this invention.

Referring now to the accompanying drawings in detail, the metal working machine of the present invention is designated generally by the reference numeral 20 and comprises a housing 21 mounted on a suitable base 22, the housing preferably consisting of a pair of complemental, juxtaposed half-sections 21a, 21b which abut each other in a vertical plane 21' (see FIG. 3) and are secured together by cross bolts 23.

As is best shown in FIGURE 2, a hydraulic cylinder 24 is mounted in the lower portion of the housing 21, the cylinder being provided at one end thereof with ear means 25 positioned on a transverse pin 26 so that the cylinder may rock or swing in a vertical plane. The piston rod 27 of the cylinder 24 is apertured and connected to a cross pin 28 carried by the lower corner portions of a pair of transversely spaced, substantially triangular actuating plates 29, the latter being rockably positioned on a cross shaft 30 which is fixed transversely in the housing 21. One end portion of the shaft 30 is journalled in a bearing 31 in the housing section 21b (see FIG. 4), while its other end portion is journalled in a similar bearing 32. Inasmuch as the housing section 21a is recessed in this region as at 33 (see FIG. 3) to accommodate a combined access door and fluid tank 34, a vertical post or channel 35a is provided in the section 21a to support the bearing 32, as will be apparent from FIGS. 3 and 4. The combined door and tank 34 will be hereinafter more fully described.

As will be observed, the shaft 30, which is the fulcrum for the actuator plates 29, is disposed substantially above the pin connection 28 of the plates to the piston 27, and two additional cross pins 35, 36 extend transversely between and are carried by the plates 29. The pin 35 is located in corners of the plates in substantially horizontal alignment with the fulcrum shaft 30, while the pin 36 is disposed in upwardly projecting ear or lug portions 29' with which the plates 29 are integrally formed, between and above the shaft 30 and pin 35, as will be apparent from FIGURE 2.

Through the medium of the pins 35, 36, the actuating plates 29 simultaneously operate two shearing plates 37, 38, respectively, the pins passing through lower portions of the plates which are sandwiched between the actuating plates 29. The upper portion of the shearing plate 37 is connected by a pin 39 to a bifurcated link 40 which is pivoted on a fulcrum shaft 41 fixed in the housing 21, the housing sections 21a, 21b being provided with bearings 42 for the shaft 41 as shown in FIGURE 6. The fulcrum shaft 41 also carries a pair of spaced links 43 which straddle the upper end portion of the shearing plate 38 and are pivoted thereto by a pin 44. It will be apparent from the foregoing that when the hydraulic cylinder 24 reciprocates the piston rod 27, the actuating plates 29 will rock about the fulcrum shaft 30 and reciprocating or translating movement in a vertical plane will be imparted to the shearing plates 37, 38, guided by the respective links 40, 43 which pivot on the fixed fulcrum shaft 41.

The plate 37 operates what may be generally referred to as work coping and notching means N, comprising a cutter 102 which is carried by the plate 37 and cooperates with a stationary blade 103 on the frame or housing of the machine. The plate 37 also operates shearing means S, including a blade 109 carried by the plate for cooperation with a stationary blade 112 on the frame. In addition, the plate 37 operates cutting means C, including a plate carried blade 123 which cooperates with a stationary blade (not shown) on the frame, the blade 123 being provided with round openings 130 and square openings 131 to accommodate round and square bar stock. The notching means N, the shearing means S and the cutting means C follow the construction which is in detail in my aforementioned Patent No. 3,169,433, so that a detailed description thereof is not necessary herein. However, it will be noted that while in the aforesaid patent the blade 123 of the cutting means C also includes an angular recess 132 for cutting angle bars, in the present invention separate cutting means C' are provided, including a blade 123' which has the angular recess 132 formed therein and which is carried by the shearing plate 38 for cooperation with a stationary blade (not shown) on the machine frame. The various means N, S, C and C' are operable simultaneously upon actuation of the hydraulic cylinder 24 and are selectively usable to perform their respective metal working operations, as desired.

The machine of the invention also includes punching means P which are operable separately from the aforementioned means N, S, C and C'.

The punching means P comprise a reciprocable ram 45 which is of a rectangular cross-section and is vertically slidable in a vertically elongated chamber 46 provided in the machine frame or housing. The lower end of the ram 45 has secured thereto a punch element 47 which cooperates with a die 48 on the machine frame. Facings 49 of suitable friction reducing material are adhesively or otherwise secured to the sides of the ram 45 and slide therewith inside the chamber 46. Conventional take-up wedges 50, 51, adjustable by conventional means 52, are provided at one side of the ram, as in customary in the art.

A hydraulic piston 53 is secured to the upper end of the ram 45 by a screw-threaded stud 54, the piston having a head 53a (see FIGURE 7) reciprocable in a dome-shaped hydraulic cylinder 55. The latter is secured to the machine frame by the bolts or screws 56, and an annulus 57 is interposed between the frame and the cylinder 55 to serve as a guide for the piston 53. Suitable ports (not shown) communicate with the space 58 below the piston head 53a and with the space 59 above the piston head so that hydraulic fluid may be admitted either below or above the piston for reciprocating the same.

The operation of the piston 53 in the hydraulic cylinder 55 is controlled by a three-position hydraulic valve 60 which is mounted inside the machine housing as shown in FIGURE 2. The valve is spring-biased to the middle of its three positions and is operatively connected by a link 61 to a manual control designated generally by the numeral 62 and shown in detail in FIGURE 8.

The manual control 62 comprises a shaft 63 rotatably journalled in the machine housing as at 64 and projecting at one end through an access door or cover plate 65 to carry a hub 66 which is keyed to the shaft 63 as at 67. A hand lever 68 is pivoted as at 69 to the hub 66 for movement laterally toward and away from the machine housing, and a double arm crank 70 is keyed to the shaft 63 inside the housing, as at 71. The aforementioned link 61 extending from the valve 60 is connected to one arm of the crank 70. It will be understood that the hub 66 and the crank 70 are bodily rotatable with the shaft 63.

Rotatably positioned on the shaft 63 adjacent the crank 70 is a second crank 72 which is prevented from sliding axially on the shaft by a collar 73. The crank 72 has pivotally connected thereto the lower end of a plunger or stem 74 which has its upper end slidable in an aperture formed in the top of the housing (see FIGURE 2), and a compression spring 75 is provided on the stem 74 so as to bias the crank 72 in a clockwise direction as viewed in FIGURE 2. Means are provided for releasably locking the crank 72 for rotation with the shaft 63, such means comprising a pin 76 which is slidably positioned in a holder 77 carried by the crank 72 (see FIGURE 8) and is pressed by a spring 78 into an aperture 79 formed in the shaft 63, the aperture also accommodating a ball 80. The shaft 63 is formed with an axial bore 81 in which is slidably positioned a plunger 82, the outer end of the plunger engaging the hand lever 68 while its inner end engages a spring 83 in the inner end of the bore 81. The spring 83 urges the plunger 82 outwardly, thus normally pressing the lever 68 outwardly about the pivot pin 69, as shown in FIGURE 8.

The inner end portion of the plunger 82 is formed with a recess 84 which receives the ball 80 when the parts are in the position shown in FIGURE 8, it being noted that in this position the pin 76 projects into the aperture 79 to lock the crank 72 against rotation on the shaft 63. In other words, in this position the crank 72 is bodily rotatable with the shaft 63 and with the lever 70 as well as the hub 66 under the bias of the spring 75 on the stem 74, and inasmuch as the spring 75 is substantially stronger than the spring in the valve 60 which biases the valve to its middle position, the spring 75 acts through the lever 72, shaft 63, lever 70 and link 61 to move the valve 60 from its middle position to one of its side positions, say to the position R as shown in the diagram of FIG. 10. The position R of the valve 60 in FIGURE 10 is distinguished from the middle position M in FIGURE 11 and from the other side position L in FIGURE 12, as will be hereinafter described.

Referring again to FIGURE 8, it will be observed that when the hand lever 68 is pressed toward the machine as indicated at 85, the plunger 82 is slid inwardly in the bore 81 against the pressure of the spring 83 and since the recessed portion 84 of the plunger moves to the left (as seen in FIGURE 8), the ball 80 is forced by the plunger into the aperture 79 and the pin 76 is pressed by the ball into the holder 77 so that it becomes retracted from the aperture 79 in the shaft 63. This action unlocks the lever 72 from the shaft 63 so that the lever 72 is free to turn on the shaft, or conversely, so that the shaft is free to turn while the lever remains stationary. By manipulating the hand lever 68 while it is being pressed toward the machine, the shaft 63 may then be turned in a counter-clockwise direction (as viewed in FIGURE 2), to move the valve 60 from the position R in FIGURE 10 to the position M in FIGURE 11 and ultimately to the position L in FIGURE 12, without encountering the resistance of the strong spring 75 on the stem 74, inasmuch as the shaft 63 is free to rotate without rotating the lever 72. The position of parts in the inwardly pressed position of the hand lever is illustrated in FIGURE 9.

The hydraulic connections of the machine are shown diagrammatically in FIGURES 10–12. A pressure compensated hydraulic pump 86 has a feed line 87 extending to the three-position valve 60 and a return line 88 extends from the valve to a fluid storage tank 89. From the tank the fluid passes through a filter 90 and line 91 to the intake of the pump. A line 92 extends from the valve 60 to the underside of the piston 53 in the cylinder 55, while a line 93 extends from the top of the piston to the valve. As diagrammatically illustrated, the three-position valve 60 has a parallel port connection in the position R, a crossed port connection in the position L, and a blind or closed port position M.

In operation, the hand lever 68 is normally pressed outwardly by the plunger 82 to the position shown in FIGURE 8 and the lever 72 is locked to the shaft 63 by the projected pin 76. In this position the machine is inactive and the spring 75 on the stem 74 acts through the lever 72, shaft 63, lever 70 and link 61 to hold the valve 60 in the position R, the spring 75 being stronger than that which normally biases the valve to the position M, as aforesaid. With the valve 60 in the position R, fluid delivered by the pump 86 passes through the lines 87, 92 to the underside of the piston 53, thus retaining the ram 45 and punch 47 in a raised position. When a piece of work is placed on the die 48, the hand lever 68 is pressed as at 85 to unlock the lever 72 from the shaft 63, whereupon the shaft 63 may be rotated by the hand lever 68 so that the crank 70 and link 61 move the valve 60 to the position M and ultimately to the position L wherein the fluid flow is reversed so that pressure is delivered through the lines 87 and 93 to the top of the piston 53. The piston is thus driven downwardly to bring the punch 47 toward the work and if it is desired to "spot" the work in order to locate the exact position where the work will be penetrated by the punch, further downward movement of the piston may be arrested by simply releasing the hand lever 68. When the hand lever is released the spring-biased valve 60 will automatically return to its middle position M, in which the blind or closed ports of the valve will cause the piston 53 to remain at a standstill with the punch 47 "spotted" on the work. Also, in the released position of the hand lever, the spring 83 will urge the plunger 82 outwardly and the ball 80 will be able to enter the plunger recess 84, but the locking pin 76 will not be able to enter the aperture 79 inasmuch as the shaft 63 has been rotated to place the aperture out of alignment with the pin. The punching operation may be completed by rotating the hand lever 68 to move the valve 60 from the position M to the position L, thus again admitting fluid to the top of the piston and driving the punch through the work. Upon completion of the punching operation the hand lever 68 is raised to its initial position, thus moving the valve 60 to the position R and delivering fluid to the underside of the piston to maintain the punch raised. Upon return of the hand lever to its raised position, the aperture 79 in the shaft 63 becomes aligned with the locking pin 76 and the spring 78 again projects the pin into the shaft aperture to lock the lever 72 to the shaft.

In order that the machine operator may have both hands free to manipulate the work, a foot treadle 94 is provided on a cross shaft 95 in the housing, the shaft 95 carrying a crank 96 to which is connected one end of a chain 97. The chain passes around suitable guide sprockets 98 and has its other end connected to the crank or lever 70, whereby rotation may be imparted to the shaft 63 either by the hand lever 68 or by the foot treadle 94.

Operation of the aforementioned hydraulic cylinder 24 is controlled by a two-position valve 95a, feed and return lines 87' and 88' communicating the valve 95a with the respective lines 87 and 88. The valve 95a is connected by a link 96a to a foot treadle 97a and is spring-biased so that it is normally in the position A shown in FIGURE 11, wherein the piston 27 is retracted and both the shearing plates 37, 38 are raised. However, upon depression of the treadle 97a, the valve 95a is moved to the position B in FIGURE 10, thus projecting the piston 27 and lowering the shearing plates to actuate the means N, S, C and C'. The hydraulic pump 86 is driven by an electric motor 98a mounted on the side section 21b of the machine housing, while the fluid tank or reservoir 89 is contained in the aforementioned hollow door 34 on the side section 21a. The combined tank and door 34 is hingedly mounted as at 99 and also accommodates the fluid filter 90, the tank having an air vent 100 as shown in FIGURE 1.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

I claim:
1. In a sheet metal working machine, the combination of a housing, first and second fulcrum shafts provided in said housing, an actuating plate rockably mounted on the first fulcrum shaft, a pair of reciprocable shearing plates, pivot means connecting said shearing plates at spaced points to said actuating plate, a pair of links pivoted to the respective shearing plates and mounted on said second fulcrum shaft, coacting metal working tools carried by said shearing plates and by said housing, and a fluid operator connected to said actuating plate for rocking the same on said first fulcrum shaft whereby to simultaneously reciprocate said shearing plates.

2. The machine as defined in claim 1 together with a fluid flow control valve connected to said fluid operator, and manual means for actuating said valve.

No references cited.

WILLIAM W. DYER, JR., *Primary Examiner.*

J. M. MEISTER, *Assistant Examiner.*